United States Patent
Wang

(10) Patent No.: US 9,920,569 B2
(45) Date of Patent: Mar. 20, 2018

(54) CLOSURE MEMBER AND THE METHOD OF MAKING THE SAME

(71) Applicant: NAN YA PLASTICS CORPORATION, Taipei (TW)

(72) Inventor: Kuei-Yung Wang, Taipei (TW)

(73) Assignee: NAN YA PLASTICS CORPORATION (TW)

( * ) Notice: Subject to any disclaimer, the term of this patent is extended or adjusted under 35 U.S.C. 154(b) by 0 days.

(21) Appl. No.: 15/186,007

(22) Filed: Jun. 17, 2016

(65) Prior Publication Data

US 2016/0340964 A1 Nov. 24, 2016

Related U.S. Application Data

(60) Provisional application No. 62/280,875, filed on Jan. 20, 2016.

(51) Int. Cl.
| | |
|---|---|
| *E06B 3/70* | (2006.01) |
| *E06B 3/58* | (2006.01) |
| *B29C 47/00* | (2006.01) |
| *B29K 27/06* | (2006.01) |

(Continued)

(52) U.S. Cl.
CPC ........ *E06B 3/7015* (2013.01); *B29C 47/0028* (2013.01); *E06B 3/5892* (2013.01); *E06B 3/7017* (2013.01); *B29C 47/0061* (2013.01); *B29K 2027/06* (2013.01);
(Continued)

(58) Field of Classification Search
CPC ........ E06B 3/7015; E06B 3/7001; E06B 3/70; E06B 3/22; E06B 3/205; E06B 2003/7023; E06B 2003/7082; E06B 2003/7086; E06B 3/82; E06B 3/5892; E06B 3/7017; E06B 2003/7049; E04C 2/36; B29C 47/0028;
(Continued)

(56) References Cited

U.S. PATENT DOCUMENTS

| | | | | |
|---|---|---|---|---|
| 3,386,221 | A * | 6/1968 | Giovannucci | E04C 2/34 52/578 |
| 5,326,615 | A * | 7/1994 | Tsuchihashi | B32B 3/12 296/191 |

(Continued)

FOREIGN PATENT DOCUMENTS

DE 2737046 A1 * 3/1978 ........... B28B 19/003

OTHER PUBLICATIONS

Machine translation of foreign reference DE 2737046, obtained from http://translationportal.epo.org/emtp/translate/?ACTION=description-retrieval&COUNTRY=DE&ENGINE=google&FORMAT=docdb&KIND=A1&LOCALE=en_EP&NUMBER=2737046&OPS=ops.epo.org/3.2&SRCLANG=de&TRGLANG=en (last accessed on Dec. 18, 2017) (Year: 2017).*

*Primary Examiner* — Theodore V Adamos
(74) *Attorney, Agent, or Firm* — Ostrolenk Faber LLP

(57) ABSTRACT

A closure member of a preferred configuration and the method of making the same. The closure member has a board with a major axis and two panels to sandwich a hollow interior that is partitioned by a plurality of ribs positioned at intervals within the hollow interior, the hollow interior is delimited in a first direction by a pair of opposite end walls. The hollow interior is accessible in a second direction which is substantially traverse to the first direction, and at least one of the two panels is textured during the formation of the board to form a textured outer surface of the closure mem-
(Continued)

ber, or the hollow interior is filled with a preferred reinforcement means.

15 Claims, 13 Drawing Sheets

(51) Int. Cl.
    *B29L 31/00*           (2006.01)
    *E06B 3/82*           (2006.01)

(52) U.S. Cl.
    CPC .......... *B29L 2031/724* (2013.01); *E06B 3/82* (2013.01); *E06B 2003/7049* (2013.01)

(58) Field of Classification Search
    CPC .......... B29C 47/0061; B29K 2027/06; B29L 2031/724
    USPC ........... 52/309.1, 309.2, 309.4, 782.1, 783.1, 52/783.12, 783.14, 783.18, 783.19, 784.1, 52/784.14, 784.15, 787.1, 787.11, 789.1, 52/792.1, 793.1, 794.1, 798.1, 799.1, 52/799.12
    See application file for complete search history.

(56) References Cited

U.S. PATENT DOCUMENTS

| | | | | |
|---|---|---|---|---|
| 5,580,620 | A * | 12/1996 | Campbell | E04C 2/543 428/120 |
| 5,706,620 | A * | 1/1998 | De Zen | E04B 1/12 52/220.2 |
| 5,852,910 | A * | 12/1998 | Zebedee | E06B 3/5454 52/455 |
| 6,502,357 | B1 * | 1/2003 | Stuthman | E04B 2/7448 52/239 |
| 6,821,609 | B2 * | 11/2004 | Mende | B29C 47/0028 264/177.16 |
| 6,871,600 | B2 * | 3/2005 | Norton | B61D 17/005 105/404 |
| 8,544,240 | B2 * | 10/2013 | Hughes, Jr. | E04C 2/22 52/589.1 |
| 2002/0002804 | A1 * | 1/2002 | Sheehy | E04B 1/12 52/272 |
| 2002/0020142 | A1 * | 2/2002 | Swiszcz | B31D 3/00 52/783.1 |
| 2003/0066257 | A1 * | 4/2003 | Shovlin | B44C 1/18 52/311.1 |
| 2005/0204698 | A1 * | 9/2005 | Werner | B32B 7/00 52/783.1 |
| 2006/0144013 | A1 * | 7/2006 | Rouanet | E04C 2/54 52/782.1 |
| 2008/0010924 | A1 * | 1/2008 | Pietruczynik | B29C 47/0028 52/309.1 |
| 2009/0165423 | A1 * | 7/2009 | Salerno | E06B 3/72 52/783.12 |
| 2011/0265407 | A1 * | 11/2011 | Bryson | E04D 1/20 52/302.1 |
| 2012/0085057 | A1 * | 4/2012 | Schiffmann | E04B 1/0007 52/309.4 |
| 2013/0192155 | A1 * | 8/2013 | Bergeron | E04B 2/00 52/309.1 |

* cited by examiner

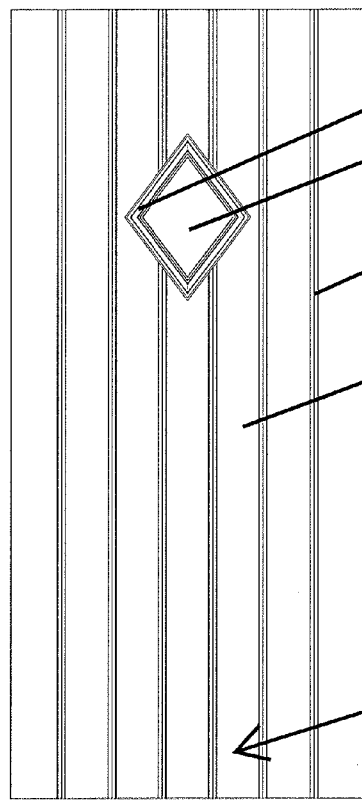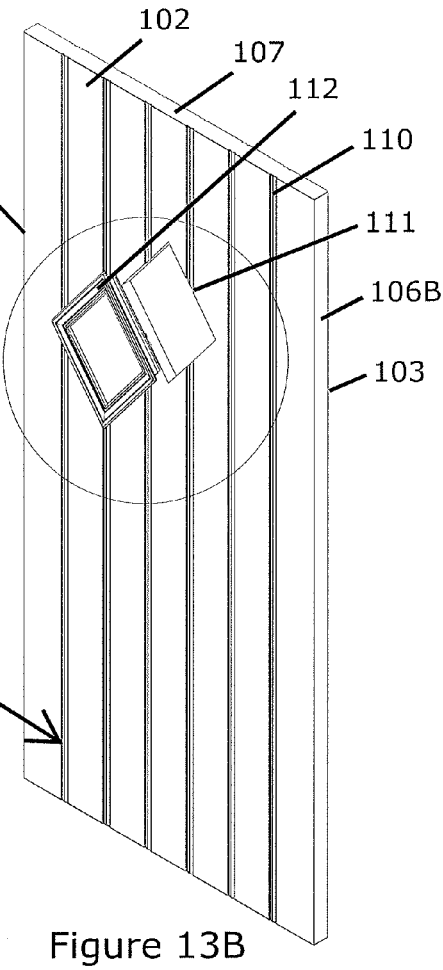
Figure 13A　　　　Figure 13B
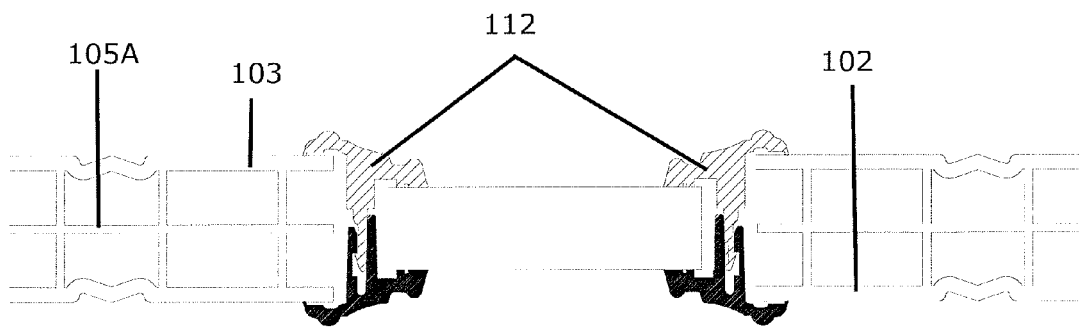
Figure 13C

CLOSURE MEMBER AND THE METHOD OF MAKING THE SAME

CROSS-REFERENCE TO RELATED APPLICATIONS

The present application claims the benefit of U.S. Provisional Application No. 62/280,875, filed Jan. 20, 2016, the contents of which are incorporated herein by reference.

TECHNICAL FIELD OF THE INVENTION

The present invention relates to a closure member and the method of making the same, for example particularly, but not exclusively, a door formed by extrusion.

BACKGROUND OF THE INVENTION

A closure member includes a door which is a movable structure used to close off an entrance, typically consisting of a panel that swings on hinges or that slides or rotate. Conventional doors with relatively high mechanical or structural strength are usually heavy and expensive to produce. The production of such a door involves numerous steps including trimming, edge beveling, sanding etc. Decorating or modifying such a door with desirable shape and patterns would involve time-consuming shaping method with considerable wastage.

For example, to enhance the structural or mechanical strength of such a conventional wooden door after it is formed would be undesirable if not impossible. The type of wood that offers the preferred strength should be selected at the outset, before the door is built. It may also be difficult to adapt the door to suit a specific entrance of awkward shape and dimension after the door is made.

The invention seeks to eliminate or at least to mitigate such shortcomings by providing a new or otherwise improved closure member and a method of making the same.

It is an objective of the present invention to provide a decorated door that is inexpensive to make. The door is flexible and adaptable to versatile applications.

It is another objective of the present invention to provide a reliable process of forming a decorated door making use of known technology with predictable and controllable production costs.

SUMMARY OF THE INVENTION

According to the invention, there is provided a closure member of a preferred configuration, comprising a board having a major axis and two panels sandwiching a hollow interior that is partitioned by a plurality of ribs positioned at intervals therein, the hollow interior is delimited in a first direction by a pair of opposite end walls, wherein the hollow interior is accessible in a second direction which is substantially traverse to the first direction, and at least one of the two panels is textured during the formation of the board to form a textured outer surface of the closure member.

Preferably, the pair of opposite end walls forms the left and right side walls of the closure member.

More preferably, the hollow interior is closed off in the second direction by a cover.

Yet more preferably, the cover includes an insertion insertable into the hollow interior of the board.

Preferably, the panels, the ribs and the opposite end walls are formed by extrusion.

Advantageously, the panels, the ribs and the opposite end walls are integrally formed as one piece.

More advantageously, the hollow interior is filled with a preferred reinforcement means.

In a second aspect of the invention there is provided a closure member of a preferred configuration, comprising a board having a major axis and two panels sandwiching a hollow interior that is partitioned by a plurality of ribs positioned at intervals, the hollow interior is delimited in a first direction by a pair of opposite end walls, wherein the hollow interior is occupied by reinforcement means.

Preferably, the hollow interior is partitioned at intervals to form discrete elongate spaces that extends along the major axis.

It is preferable that discrete elongate space is filled with the reinforcement means which is preformed into an elongate piece and dimensioned to be fitted into the discrete elongate space for enhancing the tensile strength of the board.

Preferably, the elongate piece is made of a material selected from a group consisting of wood, plastic and metal.

More preferably, the insertion is insertable into an end portion of the discrete elongate space to prevent access to the hollow interior.

Yet more preferably, the ribs extend parallel to the major axis in the hollow interior, and are closer apart in a region adjacent at least one of the end walls of the board than those in a region at or adjacent the centre of the board.

Advantageously, at least one of the panels is textured by way of having one or more grooves thereon.

It is advantageous that texture on the panel is formed together with the rest of the overall closure member by way of extrusion.

It is preferable that at least one of the panels is decorated with a decoration fixed to thereto.

More preferably the decoration is press fit into the groove.

It is preferable that at least one of the panels is textured by way of having one or more shaped grooves thereon which are formed together with the rest of the overall closure member by way of extrusion, and the decoration includes a base having a shape corresponding to that of the groove and is attached to the groove.

More preferably, the panel includes an aperture for accommodating a part of the decoration, the decoration includes a deformable anchor for insertion into the aperture when compressed and thereafter for abutting an underside of the panel when expanded.

It is preferable that both of the panels have apertures formed at corresponding position for accommodating respective decoration which are provided with a coupler for inter-engagement between the panels.

Advantageously, the decoration is fixed to the panel by a two part coupler, with one part being provided on an inner side of the panel coupling with another part being provided on an outside of the panel.

Preferably, the board includes an aperture which extend across the hollow interior and beyond the panels to form a through hole for accommodating a window with frame therein.

In a third aspect of the invention there is provided a method of forming a closure member as discussed above comprising the step of forming a board by way of extrusion, the board has a major axis and two panels sandwiching a hollow interior that is partitioned by a plurality of ribs positioned at intervals, the hollow interior is delimited in a first direction by a pair of opposite end walls, texturing at least one of said panels during the formation of the board by way of rolling a textured roller 200 thereon.

Preferably, the ribs and the pair of opposite end walls are integrally formed by way of extrusion.

More preferably, the hollow interior is partitioned at intervals to form discrete elongate spaces extending along the major axis.

In a fourth aspect of the invention there is provided a method of forming a closure member comprising the step of forming a board by way of extrusion, the board has a major axis and two panels sandwiching a hollow interior that is partitioned by a plurality of ribs positioned at intervals to form discrete elongate spaces, the hollow interior is delimited in a first direction by a pair of opposite end walls, filling at least one of the discrete elongate spaces with reinforcement means.

Preferably, the step of texturing at least one of said panels during the formation of the board by way of rolling a textured roller 200 thereon.

More preferably, the discrete elongate space is filled with the reinforcement means which is preformed into an elongate piece and dimensioned to be fitted into the discrete elongate space, the reinforcement means enhances the tensile strength of the board.

Yet more preferably, the method further including the step of closing off the hollow interior by a cover.

It is preferably that the cover includes an insertion insertable into the hollow interior of the board.

Preferably the insertion is insertable into an end portion of the discrete elongate space to prevent access to the hollow interior It is advantageous that the method further comprising the step of decorating the panel by a decoration.

Advantageously, the step of decorating the panel by a decoration involve fixing the decoration to the panel by a two part coupler, with one part being provided on an inner side of the panel coupling with another part being provided on an outside of the panel.

It is preferable that the method further comprising the step of providing an aperture on the board, wherein the aperture extends across the hollow interior and beyond the panels to form a through hole for accommodating a window and frame therewith.

Preferably, the panel has at least one groove formed with the rest of the board by way of extrusion.

More preferably, the panel has at least one depression formed by rolling over the panel a textured roller 200 with at least one protrusion.

Yet more preferable that the step of decorating the panel by a decoration involve providing a shaped groove to the panel during extrusion, and attaching a decoration with a shape corresponding to shape of the groove.

Preferably the step of decorating the panel by a decoration involves drilling an aperture on the panel, providing a decoration with a deformable anchor, compressing the anchor for insertion into the aperture and expanding the anchor for abutment with an underside of the panel.

It is preferable that the step of decorating the panel by a decoration involves drilling corresponding apertures on each panel, providing a decoration, which has two parts couplable by way of a coupler, fixing the parts of the decoration to respective aperture on respective panel, and inter-engaging the coupler between the panels.

In a further aspect of the invention, there is provided a closure member of a preferred configuration, comprising a board having a major axis and two panels sandwiching a hollow interior that is partitioned by a plurality of ribs positioned at intervals, the hollow interior is delimited in a first direction by a pair of opposite end walls, wherein the plurality of ribs includes first rib that extend parallel to the major axis in the hollow interior and at least one second rib that extends traverse to the major axis in the hollow interior.

Preferably, the hollow interior is occupied by reinforcement means.

Preferably, wherein the second rib contributes to an overall thermal transmission (U value) of the closure member by increasing a thermal resistance (R value).

More preferably, the thermal resistance is a sum of thermal resistance in each layer of material in the closure member.

BRIEF DESCRIPTION OF DRAWINGS

The invention will now be more particularly described, by way of example only, with reference to the accompanying drawings, in which:

FIG. 13A is a front view of a further embodiment of a door according to the invention;

FIG. 13B is a perspective view of the door in FIG. 13A;

FIG. 13C is an enlarged cross-sectional view of the door in FIGS. 13A and 13B showing a part of the door;

DETAILED DESCRIPTION OF PREFERRED EMBODIMENT

Figure 1:
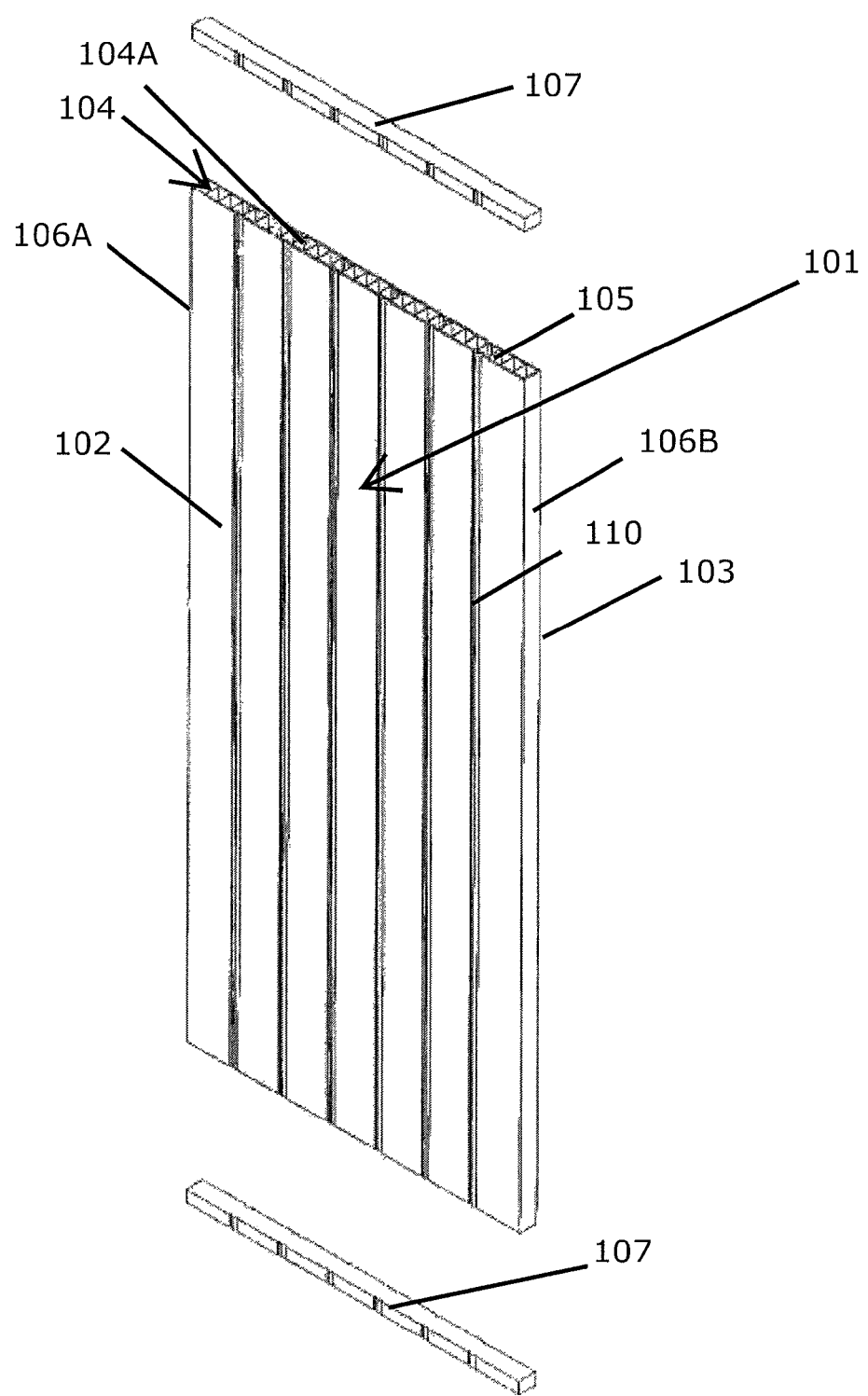
FIG. 1 is a perspective view of a first embodiment of a door according to the invention.
Figure 2:
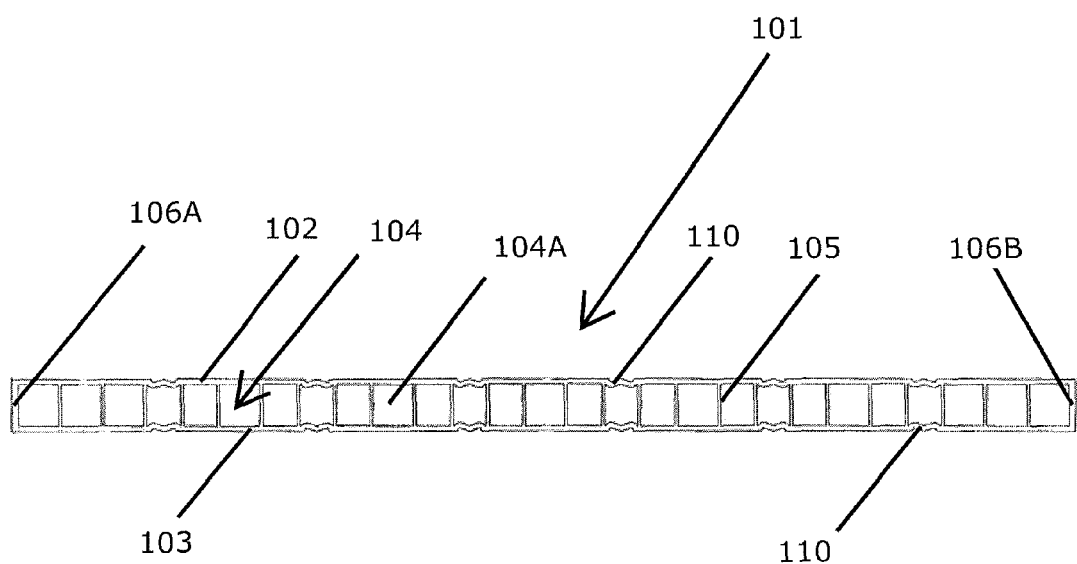
FIG. 2 is an enlarged cross sectional view taken along width of the door in FIG. 1.

Referring to FIGS. 1 to 13C of the drawings, there is shown a closure member 100 in the form of, for example, a door. The closure member 100 is useful in closing off a space such as a room.

The closure member 100 is a piece of board-like structure 101 which is preferably a single piece formed by extrusion to create a door of a fixed cross-sectional profile. The board 101 includes a front panel 102 and a rear panel 103 spaced apart to form a hollow interior 104. The hollow interior 104 is maintained by the presence of one or more ribs 105 and two end walls 106A and 106B at the left and right ends of the board 101. All these features are preferably integrally formed in a single extrusion step.

The hollow interior 104 is partitioned by the ribs 105. In one embodiment, as shown in FIG. 1, the ribs 105 are evenly distributed across width of the board 101 and extend along length of the board 101 to define a plurality of elongated discrete spaces 104A that extend along length of the board 101. In a preferred embodiment, each of the elongated discrete spaces is about 3.4 inch wide and extends along the entire length of the board 101.

Figure 7:
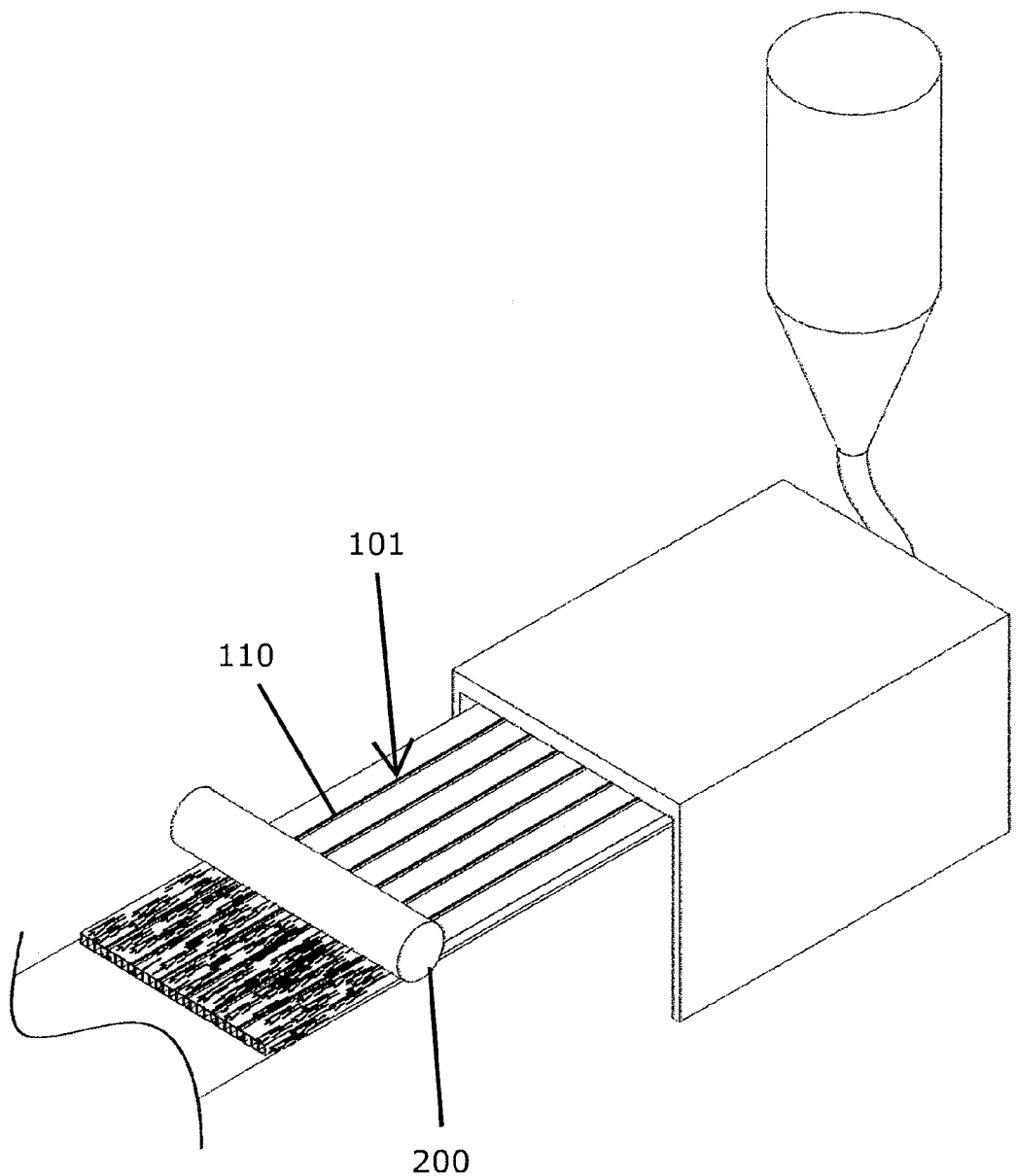
FIG. 7 is a perspective view of an extrusion process for production of the door in FIG. 1.
Figure 8:
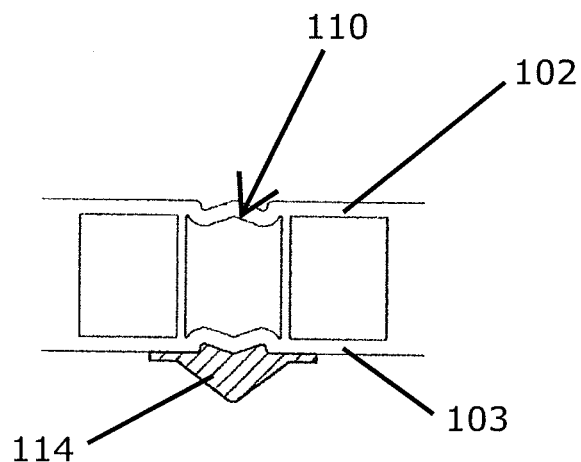
FIG. 8 is a cross-sectional view of a part of the door in FIG. 1 with decorations press fit into a groove formed by way of extrusion with the rest of the door. NEW

Referring to FIG. 1, the front and rear panels 102 and 103 are textured. As can be seen in FIGS. 7 and 8, some of the textures are formed together with the rest of the door in a single extrusion step. For example, it is possible to form shaped groove 110 and shaped depression/sink 108 on the front and/or rear panels 102 and 103 in a single extrusions step by using a specific die.

The groove 110 may be of a preferred cross-sectional shape, for example pleated or W-shaped, as can be seen in FIG. 8. Accessories may be fit into the grooves or depression 110. The accessory includes a decorative surface 114A provided on top of a complementarily shaped seat 114B that fits into the W-shaped groove and is adhered thereto by adhesive.

Other textures are formed when the material on the front and rear panels 102 and 103 are soft and are able to adopt pattern on a textured roller 200. The textured roller 200 rolls over an outer surface of the front or rear panel 102 or 103 to create the corresponding and preferred texture, for example, the textured roller 200 may have a number of protrusions which press onto the outer surface of the panel 102 or 103 to create the same number of depressions 110 in a preferred configuration complementary to the shape of the protrusions on the roller 200. This would be a simple one step process. Another example would be to apply textured wood patterns on the panel 102 or 103. A roller 200 with textured wood patterns will be used to roll over the outer surface of the front and/or rear panels 102 and/or 103 to create the corresponding wood patterns thereon.

The board 101 is sealed off on the left and right sides by the side walls 106A and 106B. These side walls 106A and 106B may be a rib 105 or is thickened to provide extra tensile strength.

The upper and lower ends of the board 101 are opened. This allows reinforcement means to enter the hollow interior 104 for increasing the tensile strength of the board 101. The hollow interior 104 is closed off by top and bottom covers 107. In the preferred embodiment, the top and bottom covers 107 are of same construction. It includes at least one insertion/protrusion extending from an inner side of a cover plate. An outer side of the cover plate provides a smooth finishing when the cover 107 is placed onto the board 101. The insertion is shaped and dimensioned to be inserted into an end portion of the elongate discrete spaces 104A. Friction holds the cover 107 in place. Preferably a seal is provided between the cover and the board 101 such that the door is waterproof. The seal may be an adhesive. When viewed from outside the closure member 100, the covers 107 flush with the board 101 to form a smooth and clean finishing.

In another embodiment, independent insertions are provided to be inserted to respective end portion of the elongate discrete spaces and a cover plate is applicable over free ends of the insertion to provide a tidy and smooth finishing.

As shown in FIG. 1, the cover 107 may well be a bar to be adhered to the top of the board 101 and the ribs 104.

Figures 3A, 3B:
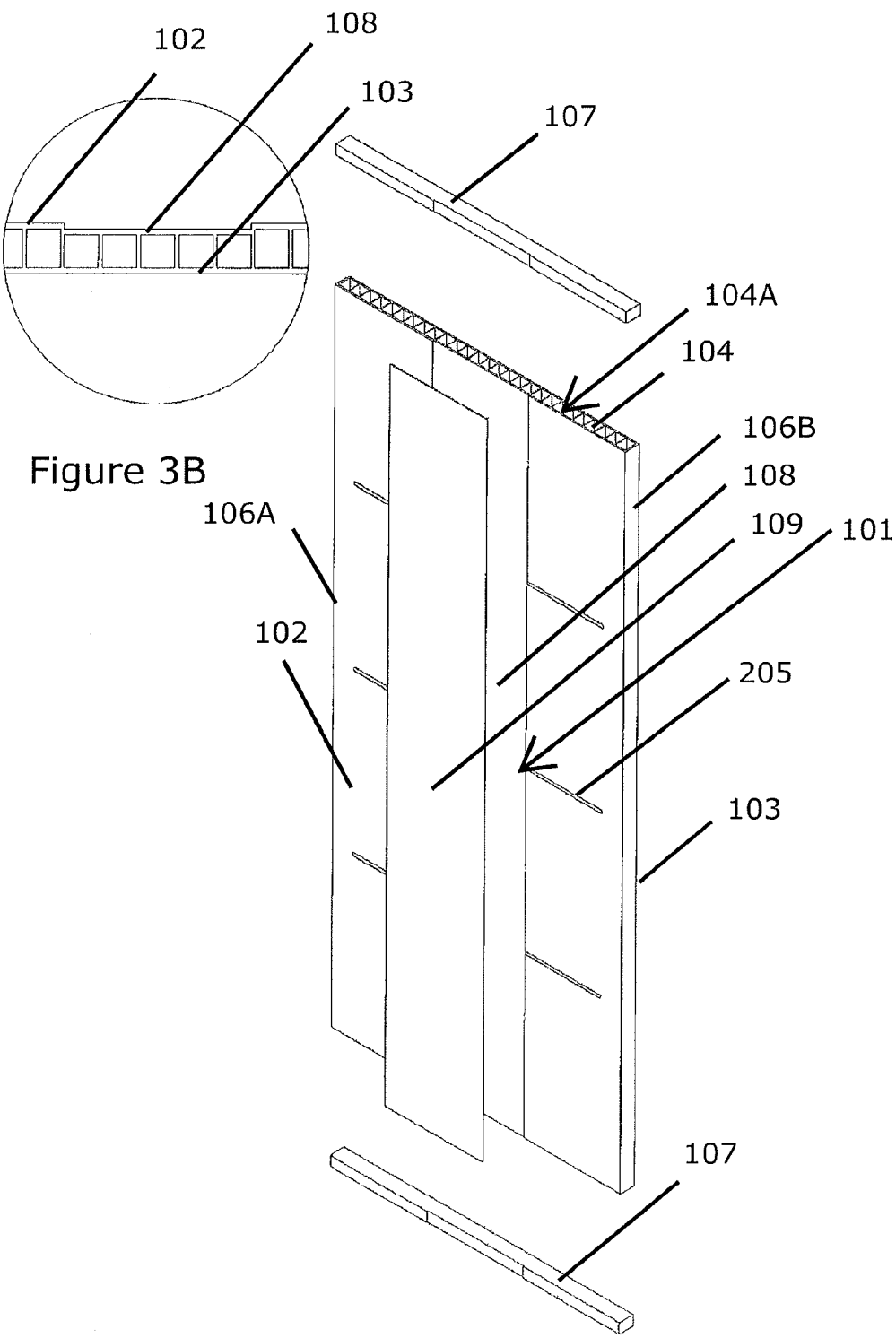
FIG. 3A is a perspective view of a second embodiment of a door according to the invention.
FIG. 3B is an enlarged cross sectional view taken across length of the door in FIG. 3A showing part of that door.

During extrusion, the die is designed to produce a sink 108 on the outer surface of the front panel 102 of the board 101 as shown in FIG. 3A. This sink 108 is configured to accommodate a decorative plate 109. Adhesive may be applied to adhere the decorative plate 109 to the sink 108. The horizontal grooves 205 may be formed by way of extrusion or by a roller 200 with corresponding protruding rim thereon.

The upper and lower ends of the board 101 may be sealed off or covered by top and bottom covers 107.

In a further embodiment, it is possible to have the front and rear panels 102 and 103 polished for direct printing of visual texture e.g. wood-like finishing onto the panels 102 and 103.

Figures 4A, 4B:
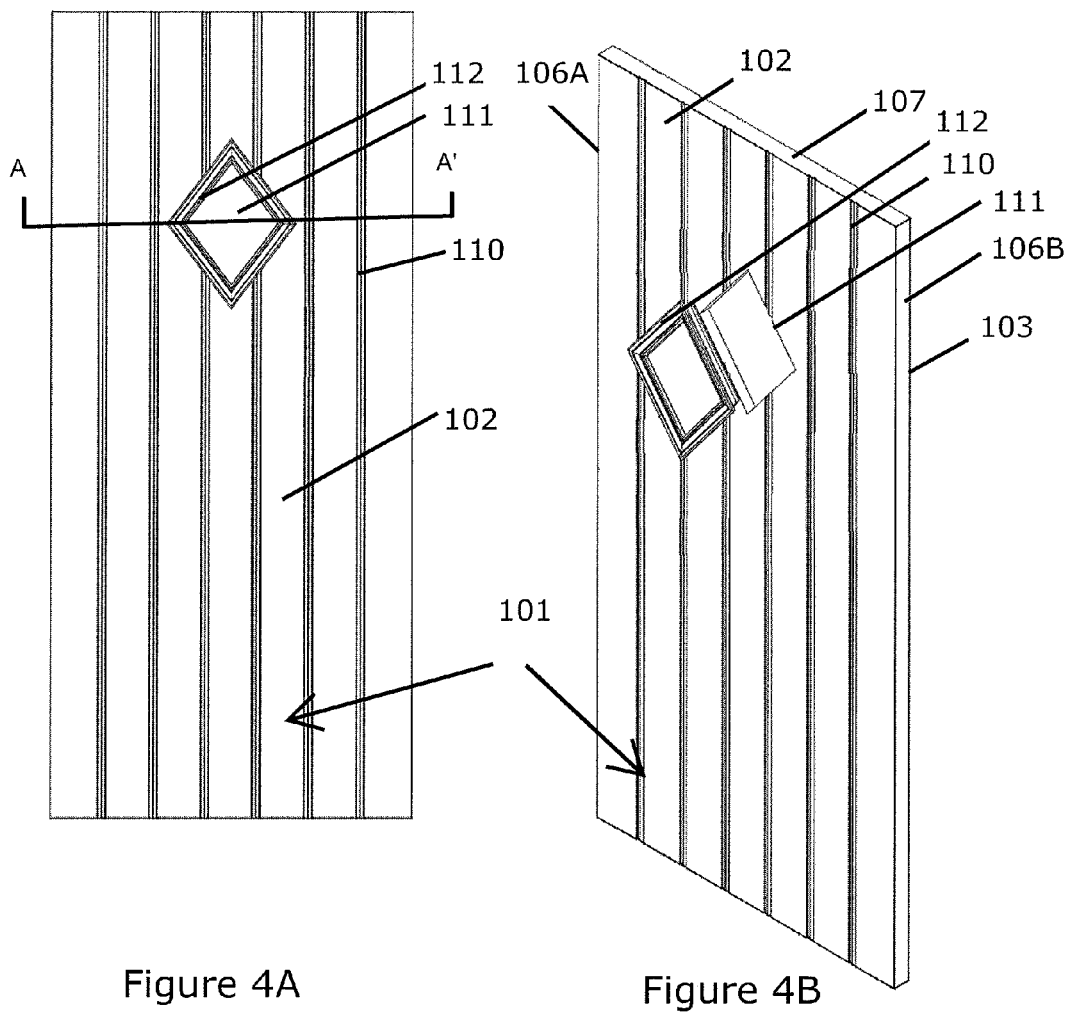
FIGS. 4A and 4B are perspective view of a third embodiment of a door according to the invention.
Figure 4C:
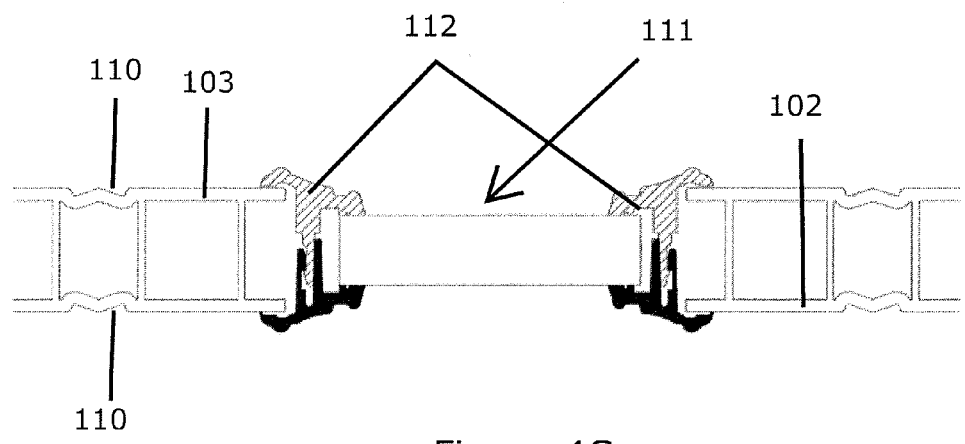
FIG. 4C is an enlarged cross-sectional view of a part of the door in FIG. 4A taken along line A-A'.

As shown in FIGS. 4A and 4B, a portion of the board 101 is removed by way of cutting or milling to form an aperture 111. The aperture 111 may be a glazed window fitted with window frame/bead 112. In this specific embodiment, the aperture is of a diamond shape at an upper portion of the panels 102 and 103. The aperture 111, hence the window may be of any shape and any size within the ambit of the panels 102 and 103. One or more decorative ornaments may be fixed to the panel 102 or 103. These decorative ornaments can be coupled to the panel 102 or 103 by conventional means.

Figure 5A:
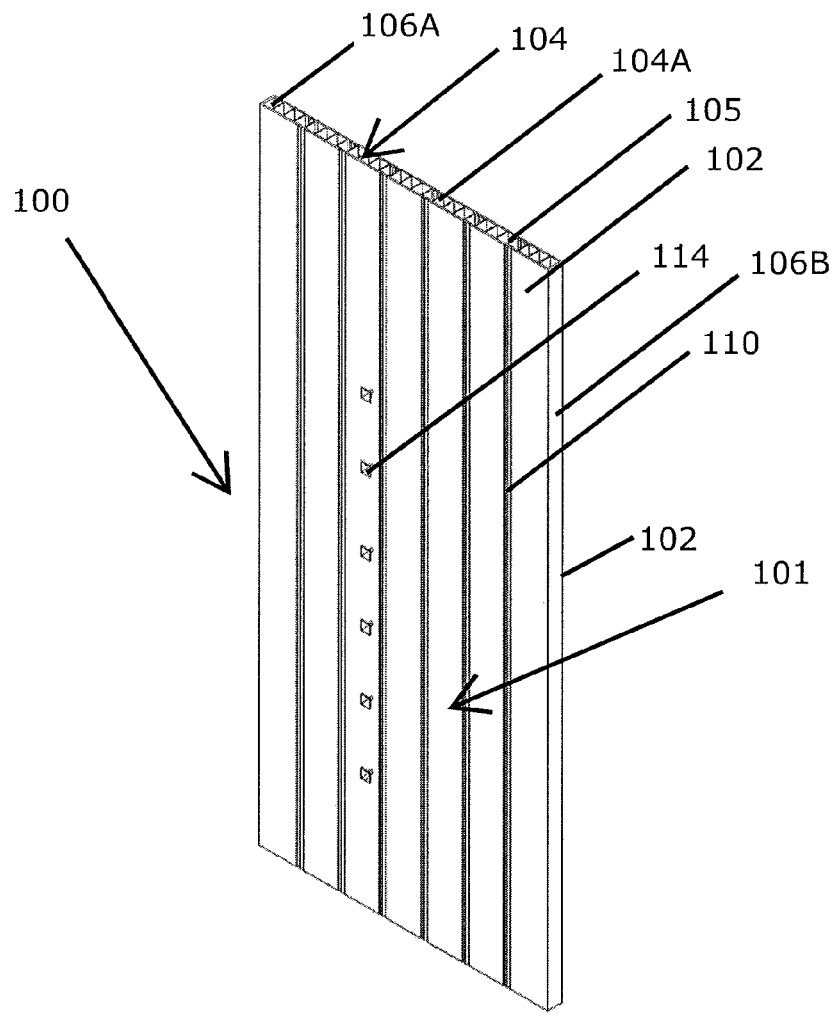
FIG. 5A is a perspective view of a further embodiment of a door according to the invention.
Figure 5B:
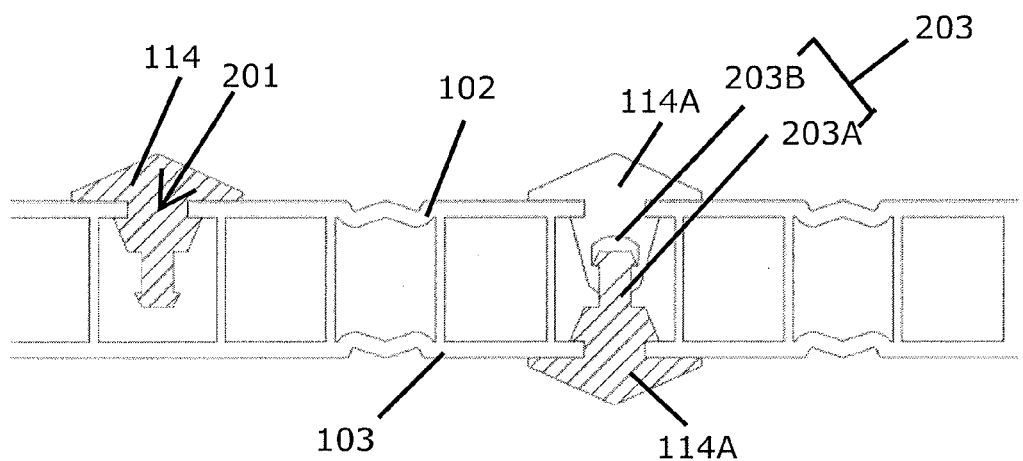
FIG. 5B is a cross-sectional view of a part of the door in FIG. 5A.

FIGS. 5A and 5B shows a door with decorative studs 114 there on. These studs 114 may be provided on one panel 102 or both panels 103 in corresponding positions. The studs 114 may be configured to be press fit into apertures 201 opened on the panels 102 and/or 103, preferably by way of drilling, after the board 101 is formed from extrusion. The studs 114 may have a base with resiliently deformable anchor 202 allowing it to be pushed through the aperture 201 by compressing the anchor 202. Once passed the aperture 201, the anchor 202 is allowed to expand and abuts an inner side of the panel 102/103. Alternatively, as can be seen in FIG. 5B, two studs 114A are provided at corresponding positions on the panels 102 and 103 respectively by insertion into apertures opened by way of drilling after extrusion. Each pair of studs 114A are couple-able with one another by way of a coupler 203 provided at the bases of the studs 114A. The coupler 203 includes a female coupler 203B and a male coupler 203A provided on the studs 114A respectively. The coupler as shown in FIG. 5B is only a preferred embodiment and may be replaced by any conventional coupler. The base of the male coupler 203A includes a resiliently deformable anchor which is pressed through an opening in the female coupler 203B by deformation. The anchor is allowed to expand and occupies the space behind the opening in the female coupler 203B and abut the two flanges that defines the opening in the female coupler 203B to prevent disengagement of the coupler 203.

One or more shaped groove 110 is provided on the panel 102 and/or 103. This is formed with the rest of the board 101 by way of extrusion. Instead of drilling or milling holes or apertures on the panels 102 and 103 which constitute permanent damages, a stud 114 with a base having a shape that correspond to the shape of the groove 110 may be used provided for fixing, more preferably adhering, to the groove 110 of the board 101. Adhesive may be used for adhesion.

Figure 6:
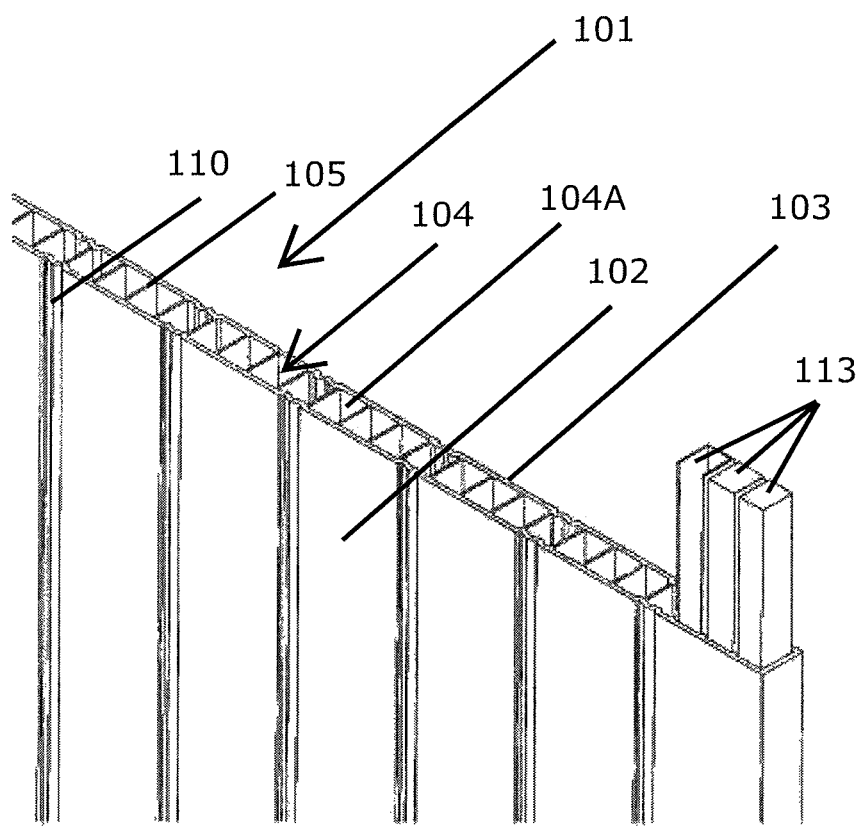
FIG. 6 is an enlarged perspective cross sectional view of the door in FIG. 1 with reinforcement means.

Referring to FIG. 6, the board 101 may be customized for use in different conditions. For example, the door may be strengthened for use as a front door of a house which is always up against wind, rain and possibly snow. To increase the impact strength, tensile strength and flexural strength of the door, reinforcement means 113 may be inserted into respective elongate discrete spaces 104A. Different materials with different properties may be inserted into different spaces 104A. For example, wood may be inserted into the spaces 104A immediately next to and adjacent the side ends 106A and 106B to provide support for the lock assembly. Wood is easy to maneuver.

Stronger reinforcement means 113 may be used to fill the spaces 104A closer to the centre of the board 101 for increasing the impact, tensile and flexural strength. These reinforcement means 113 are of a specific configuration and dimension to be fitted into the spaces 104A. They are secured to the hollow interior 104 by adhesive. Other conventional means may also be used. The reinforcement means 113 may be strips of wood insertable into respective spaces 104A.

It is also possible to adhere fire resistant plates onto the front and/or rear panel 102 and/or 103 to increase the fire resistance of the door 100.

If weight is a concern, lighter reinforcement means 113 may be used. The door 100 may also be used within reinforcement means 113.

The door 100 is customized by using different reinforcement means 113. Even the board 101 may be made of a preferred polymer.

The reinforcement means 113 may be chunks of wood, plastic or metal moulded into specific shape, a reinforcement frame or any type of solid or liquid material that eventually solidifies.

The common material used in extrusion to form the board 101 would be PVC. As the interior 104 is hollow, less PVC is used comparing to a board 101 with a solid interior. The door 100 should be more environmental friendly and the overall cost would be lowered. If strength is a concern, then as mentioned above, the door may be customized by filling the spaces 104A with preferred material.

In another embodiment, the number of ribs 105 at an end region of the interior 104 adjacent the end wall 106A or 106B is greater than the number of ribs 105 at a centre region of the interior 104. The increased number of ribs 105 increases the strength of that region of the board 101 for supporting a door lock assembly to be placed in a hole formed on the board 101 by way of e.g. drilling.

The method of making the aforementioned board 101 includes the step of forming the board 101 by way of extrusion. Closing off the left and right side ends of the board 101 by providing end walls 106A and 106B. This step may be completed during the extrusion. A textured roller 200 is applied to the board 101 to press and create corresponding texture on the front and/or rear panels 102 and/or 103. Two covers 107 are provided to close off the upper and lower ends of the board 101. If needed, decorations 114 in the form of e.g. a stud 114 may be assembled to a predrilled hole on the front or rear panel 102/103. The stud 114 may be held in place by a conventional coupling mechanism as shown in FIGS. 5A and 5B Alternatively studs may adhered onto the panel 102/103.

Figure 9A:
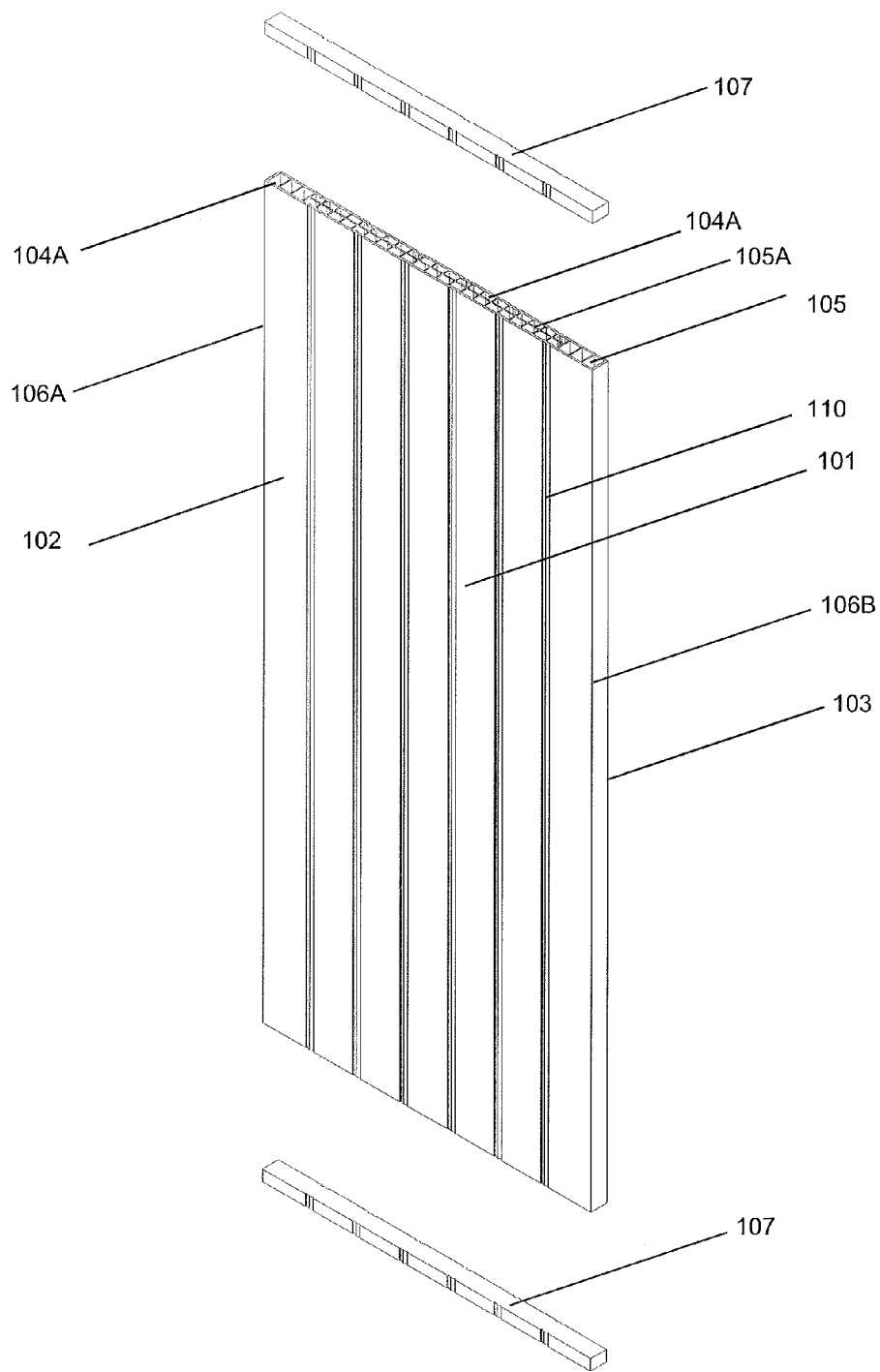
FIG. 9A is a perspective exploded view of a further embodiment of a door according to the invention.
Figure 9B:
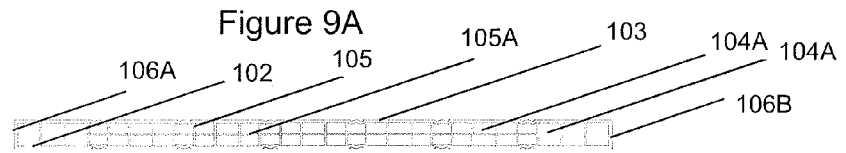
FIG. 9B is a cross sectional view taken along length of the door in FIG. 9A.

Referring to FIGS. 9A and 9B, there is provided a further embodiment of door 100 which includes a board 101 with two sets of rubs, namely first and second ribs 105 and 105A. The first ribs 105 extend parallel to the opposite end walls 106A and 106B of the board 101 across the hollow interior 104. The second rib 105A is a panel that extend in a direction traverse to or perpendicular to the opposite end walls 106A and 106B. Basically it is in the form of a further panel sandwiched between and spaced from the panels 102 and 103. This further panel 105A is preferably smaller in dimension when compared to the panels 102 and 103. Its dimension may vary depends on need which is usually a balance between the required of structural strength versus cost. The first and second ribs 105 and 105A define a plurality of elongated discrete spaces 104A that extend along length of the board 101.

Figure 10:
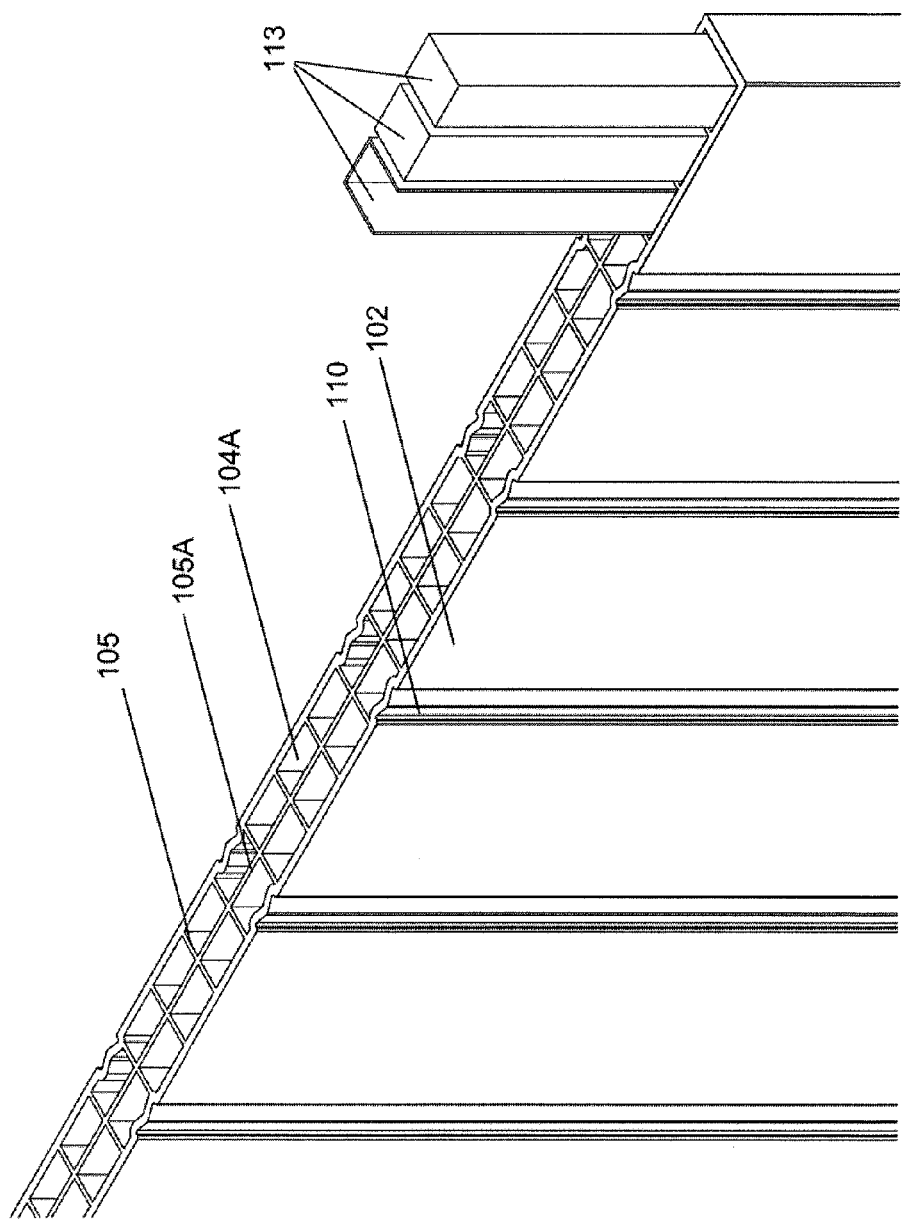
FIG. 10 is an enlarged view of a part of the cross sectional view in FIG. 9B.

As can be seen in FIGS. 9B and 10, the second rib 105A intersects with a number of first ribs 105 and as they are integrally formed, the integral intersection adds to the overall structural strength of the board 101. As such it may not be necessary to introduce the reinforcement means 113 into the elongated discrete spaces 104A therebetween. A higher structural strength of the board 101 is achieved by using less material when compared to introducing reinforcement means 113 to each of the elongated discrete spaces 104A between the first ribs 105 when the second rib 105A is not available.

As noticeable in FIG. 9B, the second rib 105A does not extend to the last three first ribs 105 adjacent the end walls 106A and 106B. Reinforcement means 113 are introduced into the respective elongated discrete spaces 104A to increase the structural strength as well as the density at those regions of the board 101 for supporting the installation of hinged joints and the latch of the door 100.

After the insertion of the reinforcement means 113, the board 101 is covered at the top and bottom by respective covers 107. These covers may include protrusions at corresponding positions for insertion into the elongated discrete spaces 104A in the hollow interior 104.

Grooves 110 may be introduced to the panels 102 and 103 when the board 101 is formed by way of extrusion. Basically all the ribs 105 and 105A as well as the grooves 110 are formed in a single step of extrusion.

Figures 11A, 11B:
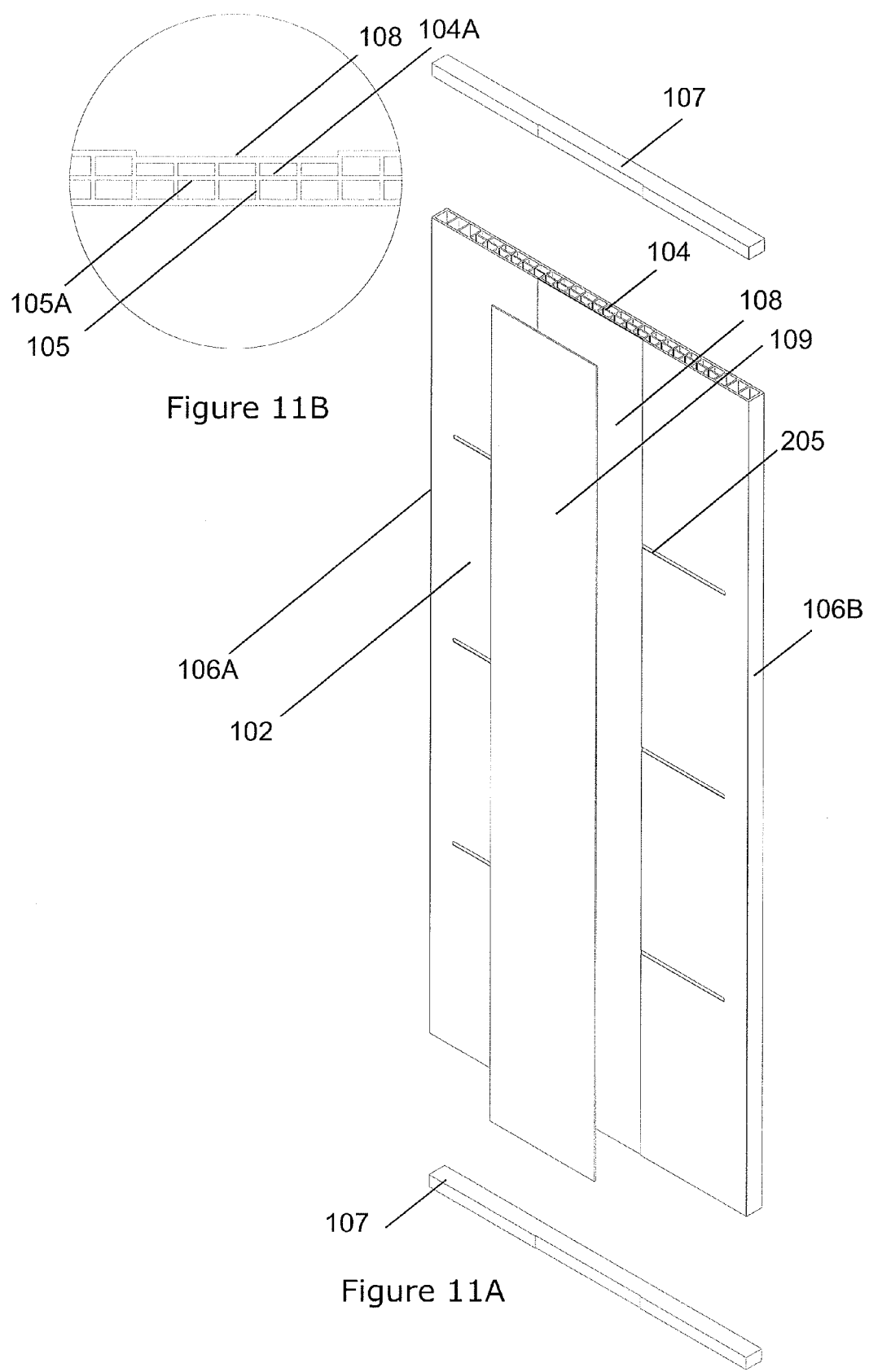
FIG. 11A is a perspective exploded view of another embodiment of a door according to the invention.
FIG. 11B is an enlarged cross-sectional view taken along length of the door in FIG. 11A showing part of the door.

Referring to FIGS. 11A and 11B, shaped depression/sink 108 on the front and rear panels 102 and 103 is formed with the board 101 along with the grooves 110 and the ribs 105 and 105A in a single extrusions step by using a specific die. A decorative plate 109 may be fitted to the depression/sink 108 and be fixed thereto with the use of a binding agent such as adhesive. When the hollow interior 104 is partitioned by first and second ribs 105 and 105A, the cross-sectional size of the elongated discrete spaces 104A between the second rib 105A and the depression/sink 108 is smaller than that of the spaces 104A between the rear panel 103 and the second rib 105A.

The covers 107 for the door 100 in FIGS. 11A and 11B also include the corresponding depression/sink 108 on its front and/or rear surface. In other words, the decorative plate 109 extends to the covers 107 to provide a continuous and unitary decorative outer surface.

FIGS. 12A to 12D show a door with decorative studs 114 there on.

Figures 12A, 12B:
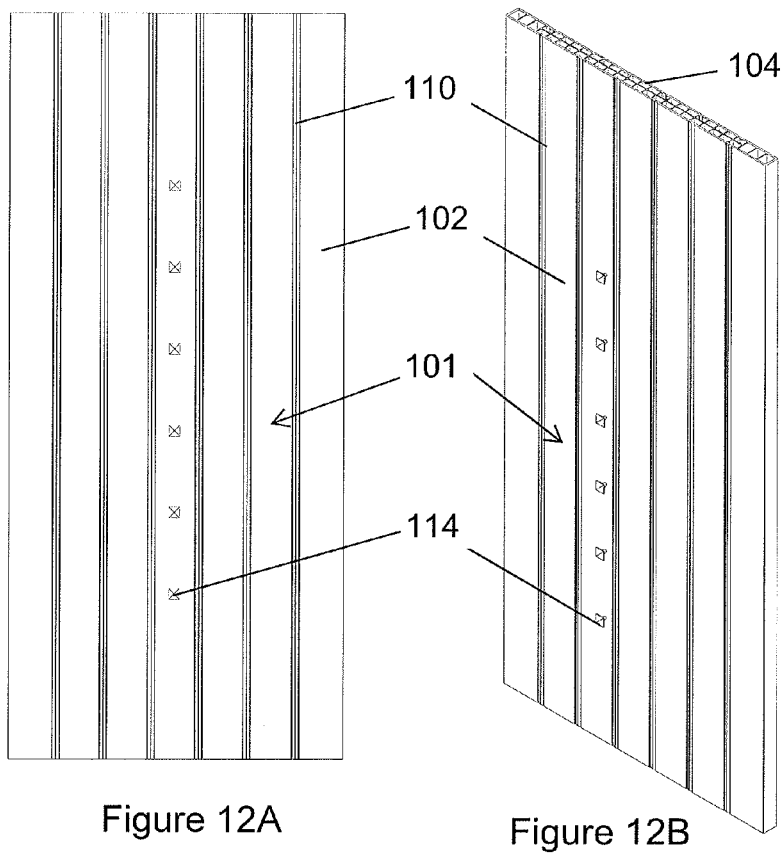
FIG. 12A is a front view of the door in FIGS. 9A and 9B with decorative accessories.
FIG. 12B is a perspective view of the door in FIG. 12A.
Figure 12C:
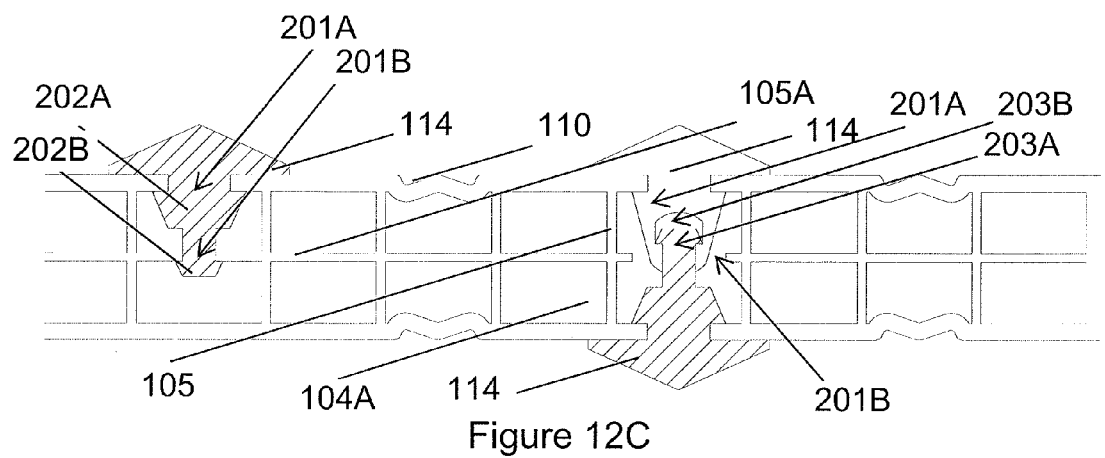
FIG. 12C is an enlarged cross-sectional view of the door in FIGS. 12A and 12B showing first and second arrangements of the decorative accessories on the door.

FIG. 12C shows two embodiments of the stud 114. These studs 114 may be provided on one panel 102 or both panels 103 in corresponding positions. The studs 114 may be configured to be press fit into apertures 201 opened on the panels 102 and/or 103 preferably by way of drilling or milling or cutting after the board 101 is formed from extrusion. The studs 114 may have a base with a resiliently deformable anchor 202. As the anchor is deformable, it can be compressed and pushed through the aperture 201. Once passed the aperture 201, the anchor 202 is allowed to expand and abuts an inner side of the panel 102/103.

Where there is a second rib 105A, as shown in the left of the FIG. 12C the stud 114 may include two anchors 202A and 202B. Two apertures 201A and 201B are opened on the panel 102 and the second rib 105A respectively. The anchors 202A and 202B are provide along a stem of the stud 114 and are spaced apart. When the stud 114 is forced into the aperture 201A, both anchors 202A and 202B are forced through. The anchor 202B went further and is forced through the aperture 201B on the second rib 105A. The apertures 201A and 201B has different diameters hence the anchors 202A and 202B have different sizes. Once the anchors 202A and 202B pass the respective apertures 201A and 201B by deformation, they expand and abut an inner surface of the panel 102 and the second rib 105A respectively for anchorage.

In a different embodiment, as can be seen in the right of FIG. 12C, two studs 114A are provided at corresponding positions on respective panels 102 and 103 by insertion into apertures 201 opened by way of drilling after extrusion. Each pair of studs 114A are couple-able with one another by way of a coupler 203 provided at the base of the stud 114A. The coupler 203 includes a female coupler 203B and a male coupler 203A provided on the free end of the base of the respective stud 114. The coupler as shown in FIG. 5B is only a preferred embodiment and may be replaced by any conventional coupler. The apertures 201 on the panels 102 and 103 and the second rib 105A are aligned and of the same size. On each stud 114 behind the coupler there is an anchor 202. The anchor is a resiliently deformable anchor 202 that is forced through the aperture 201 by deformation to allow the coupler 203 on the corresponding studs 114 to engage in the interior 104. Once pass the aperture 201, the anchor 202 of the corresponding studs 114 expands and abuts respective inner wall of the panels 102 and 103. The male and female couplers 203A and 203B are snap fitted to couple.

Figure 12D:
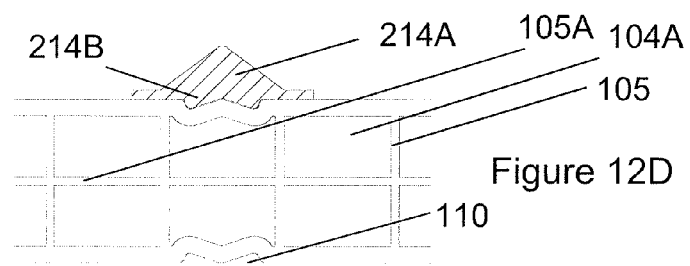
FIG. 12D is an enlarged cross-sectional view of a part of the door in FIGS. 12A and 12B showing a third arrangement of the decorative accessory on the door.

Referring to FIG. 12D, the decorative stud 214A may be fitted to the groove 110. The stud 214A has a shaped/pleated base 214B which complement the shape of the groove 110. The base may be placed in the groove 110 and is fixed thereto by a binding agent such as an adhesive.

As shown in FIGS. 13A, 13B and 13C, a portion of the board 101 is removed by way of cutting or milling to form the aperture 111. The aperture 111 may be fitted with a window and the window frame/bead 112 as shown in FIG. 13C. The window beads 112 are snap fit to the aperture 111 while sandwiching a glass or decorative panel.

The thermal transmission (U value) of the door 100 is represented by the following mathematical formula:

$$U=1/R=k/d$$

It is apparent from the above formula that an increase in the thermal resistance (R value) decreases the U value.

A R value of a door 100 is a sum of the $R_i$ value in each layer of material in which thermal transmission occurs:

$$R=\Sigma R_i$$

and the U value can be represented by the following formula:

$$U=1/\Sigma R_i$$

The $R_i$ value is an average value of an upper resistance limit $R_u$ and lower resistance limited $R_L$ of a particular layer in which thermal transmission occurs:

$$R_i=(R_u+R_L)/2$$

And the U value may be represented by the following formula:

$$U=1/\Sigma[(R_u+R_L)/2]_i$$

Based on the above, one may be able to conclude that the R value of the door 100 increases with the number of layers through which thermal transmission occurs.

The presence of a second rib 105A in the door 100 increases the number of layers through which thermal transmission occurs, hence increases the R value of the door 100. By increasing the R value of the door 100, the U value of the door 100 decreases. It may be concluded that a door 100 with the second rib 105A would have lower thermal transmission ability than a door without such second rib 105A. The door 100 with a second rib 105A is more capable in maintaining a stable temperature within a space with the door 100 closed. For example, the door 100 with a second rib 105A may be more suitable for use as the main door to resist the environmental temperature fluctuation.

In more detail, in a door 100 without the second rib 105A, heat within the door 100 may be transmitted through two different paths. The maximum layers of thermal transmitter would be three. Heat is transmitted through the front panel 102, rib 105 and the rear panel 103, or through the front panel 102, air and the rear panel 103.

In a door 100 with the second rib 105A, heat may be transmitted in two different paths. The first path includes three layers and the second includes five layers of thermal transmitters i.e. the front panel 102, air, the second rib 105A, air and the rear panel 103. As the R value of such a door 100 is greater than the R value of the door 100 without the second rib 105A, the U value of the door 100 with second rib 105A is lower. As such, the door 100 with the second rib 105A is more heat resisting than that without it.

The invention has been given by way of example only, and various other modifications of and/or alterations to the described embodiment may be made by persons skilled in the art without departing from the scope of the invention as specified in the appended claims.

What is claimed is:

1. A closure member, comprising:
a board having a major axis and two panels sandwiching an open ended hollow interior that is partitioned by a plurality of ribs positioned at intervals, the hollow interior is delimited in a first direction by a pair of opposite end walls and is accessible in a second direction which is substantially transverse to the first direction, the hollow interior is closeable in the second direction by a cover;
the hollow interior includes a center region and two side regions, the plurality of ribs include a plurality of first ribs each having a length that extends parallel to the major axis in the hollow interior and at least one second rib that comprises a length that extends parallel to the major axis and a width that extends transverse to the major axis and the plurality of first ribs in the hollow interior but does not reach the end walls;
a portion of the plurality of first ribs and the at least one second rib intersect within the hollow interior to form a plurality of intersections for enhancing structural strength of the closure member relative to a closure member that does not include such intersections, the plurality of first ribs being closer to one another in a region adjacent at least one of the end walls of the board than in a region at or adjacent the center region of the board, at least part of the hollow interior is occupied by reinforcement material;

wherein the panels, the first and second ribs and the opposite end walls are formed integrally as one piece by extrusion, and wherein the plurality of first ribs extend between and transverse to the two panels.

2. The closure member as claimed in claim 1, wherein the hollow interior is partitioned by the first and the second ribs to form discrete elongate spaces that extend along the major axis.

3. The closure member as claimed in claim 1, wherein the hollow interior is partitioned at intervals to form discrete elongate spaces that extend along the major axis.

4. The closure member as claimed in claim 3, wherein at least one of the discrete elongate spaces is filled with reinforcement material which is preformed into an elongate piece and dimensioned to be fitted into the discrete elongate space.

5. The closure member as claimed in claim 4, wherein the elongate piece is made of a material selected from a group consisting of wood, plastic and metal.

6. The closure member as claimed in claim 1, wherein at least one of the panels is textured by way of having one or more grooves thereon.

7. The closure member as claimed in claim 6, wherein the texture is formed together with the rest of the overall closure member by way of extrusion.

8. The closure member as claimed in claim 1, wherein at least one of the panels is decorated with a decoration fixed thereto.

9. The closure member as claimed in claim 8, wherein the decoration is press fit into a groove.

10. The closure member as claimed in claim 8, wherein at least one of the panels is textured by way of having one or more shaped grooves thereon which are formed together with the rest of the overall closure member by way of extrusion, and the decoration includes a base having a shape corresponding to that of the groove and is attached to the groove.

11. The closure member as claimed in claim 8, wherein the at least one of the panels includes an aperture for accommodating a part of the decoration, the decoration includes a deformable anchor for insertion into the aperture when compressed and thereafter for abutting an underside of the panel when expanded.

12. The closure member as claimed in claim 8, wherein the second rib includes an aperture for accommodating a part of the decoration, the decoration includes a deformable anchor for insertion into the aperture when compressed and thereafter for abutting an underside of the second rib when expanded.

13. The closure member as claimed in claim 12, wherein the aperture on the second rib is aligned with an aperture on the at least one of the panels and the decoration includes two deformable two deformable anchors for insertion into respective apertures.

14. The closure member as claimed in claim 8, wherein the decoration is fixed to the panel by a two part coupler, with one part being provided on an inner side of the at least one of the panels coupling with another part being provided on an outside of the at least one of the panels.

15. The closure member as claimed in claim 1, wherein the board includes an aperture which extends across the hollow interior and beyond the panels to form a through hole for accommodating a window with frame therein.

* * * * *